United States Patent
Weis (10) Patent No.: US 8,732,324 B2
(45) Date of Patent: May 20, 2014

(54) KEEP-ALIVE HIATUS DECLARATION

(75) Inventor: Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 12/787,127

(22) Filed: May 25, 2010

(65) Prior Publication Data

US 2011/0296044 A1    Dec. 1, 2011

(51) Int. Cl.
*G06F 15/16* (2006.01)
(52) U.S. Cl.
USPC .......................................... 709/230; 370/351
(58) Field of Classification Search
USPC .......................................... 709/230; 370/351
See application file for complete search history.

(56) References Cited

U.S. PATENT DOCUMENTS

| | | | |
|---|---|---|---|
| 8,155,129 B2 * | 4/2012 | Appanna et al. | 370/401 |
| 2006/0090067 A1 * | 4/2006 | Edmonds et al. | 713/159 |
| 2007/0240209 A1 * | 10/2007 | Lewis et al. | 726/15 |
| 2008/0089231 A1 * | 4/2008 | Appanna et al. | 370/235 |
| 2008/0144613 A1 * | 6/2008 | Adhikari et al. | 370/389 |
| 2008/0273518 A1 * | 11/2008 | Pratt et al. | 370/345 |
| 2010/0118753 A1 * | 5/2010 | Mandin et al. | 370/311 |
| 2010/0157867 A1 * | 6/2010 | Babin | 370/311 |
| 2011/0158140 A1 * | 6/2011 | Asokan | 370/310 |
| 2012/0158976 A1 * | 6/2012 | Van der Merwe et al. | 709/228 |

FOREIGN PATENT DOCUMENTS

EP    1 883 201 A1    1/2008

OTHER PUBLICATIONS

European Patent Office, Office Action in Application No. PCT/US2011/036031, Applicant: Cisco Technology, Inc., dated Oct. 21, 2011, 11 pages.
Current Claims in Application No. PCT/US2011/036031, dated Oct. 2011, 12 pages.

* cited by examiner

*Primary Examiner* — Joseph E Avellino
*Assistant Examiner* — James Conaway
(74) *Attorney, Agent, or Firm* — Hickman Palermo Truong Becker Bingham Wong LLP (57) ABSTRACT

In an embodiment, a method is performed by one or more processors and comprises obtaining a hiatus declaration that indicates that a network device will be incommunicable; suspending communication with the network device until expiration of a hiatus time period during which the network device is expected to be incommunicable; resuming communication with the network device in response to any of: determining that the hiatus time period has expired; obtaining a keep-alive message from the network device; or obtaining other indication that the network device can communicate.

14 Claims, 6 Drawing Sheets

KEEP-ALIVE HIATUS DECLARATION

TECHNICAL FIELD

The present disclosure generally relates to communications between internet devices with protocols that use keep-alive messages.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain network infrastructure devices use protocols that incorporate sending periodic keep-alive or heartbeat messages to indicate that the devices are active. However, in certain protocols if required keep-alive messages are not timely sent, a device may assume that a device failure or network failure occurred. In a cryptographic key agreement system, the inability to disseminate keep-alive messages may be interpreted as inability to participate in a data security protocol, such as IPsec or MACsec. In response, undesirable corrective actions may occur such as deleting cryptographic state or establishing a different secure connection with another device, even if the first device only incurred a partial failure, such as a failure of a message transmitting module while application-specific integrated circuit (ASIC) hardware module or on a line card that executes data security functions remains active. Similar problems, in which lack of keep-alive messages caused by partial failure results in undesired responses, may occur in the context of In-Service Software Upgrades (ISSU), various distributed systems, and systems supporting High Availability (HA) schemes.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Managing an external hiatus event
4.0 Managing an internal hiatus event and multiple external hiatus events
5.0 Implementation Mechanisms—Hardware Overview
6.0 Extensions and Alternatives
7.0 Additional Disclosure 1.0 General Overview In an embodiment, a method comprises obtaining a hiatus declaration that indicates that a network device will be incommunicable; suspending communication with the network device until expiration of a hiatus time period during which the network device is expected to be incommunicable; resuming communication with the network device in response to any of: determining that the hiatus time period has expired; obtaining a keep-alive message from the network device; or obtaining other indication that the network device can communicate.

For example, the device may send the hiatus declaration before an ISSU scheduled update, during which one of more modules of the device will be updated. As another example, the device may send the hiatus declaration before an HA event, during which one of the modules or processors takes over an execution of the functions performed by another module or processor of the peer. The hiatus time period indicates a time period during which the device is expected to be incommunicable. The hiatus time period may be determined from information included in the hiatus declaration. Alternatively, the hiatus time period may be determined based on information stored in a storage unit of the receiving device.

In an embodiment, upon determining that the hiatus time period has expired, the receiving device resumes communications with the device. However, if the hiatus time period has not expired, other conditions may be checked to determine whether communications with the network device may be resumed. For example, communications with the network device may be resumed if the receiving device received a new keep-alive message from the device. Receiving a new keep-alive message from the network device indicates that the network device might have finished its hiatus earlier than it was anticipated, and sent the new keep-alive message to the nodes to advertise that the device became communicable.

In an embodiment, communications with the network device may be resumed if the device sent any of several forms of other indication that the device can communicate before the expiration of the hiatus period. For example, the network device may send a message indicating that the device completed a module upgrade sooner than anticipated.

In an embodiment, a method comprises obtaining an external hiatus declaration from a network device, indicating that the network device will be incommunicable; suspending communicating with the network device until a particular hiatus time period expires; upon expiration of the particular hiatus time period, sending, to one or more other network devices, an internal hiatus declaration indicating that no communications will occur until after a specified internal hiatus time period; suspending communicating with the one or more other network devices; in response to determining that the internal hiatus time period has expired, resuming communicating with the one or more other network devices;

Thus in certain embodiments a receiving device may declare its own hiatus period and send an internal hiatus declaration to other devices. The receiving device may send the internal hiatus declaration to other devices before the expiration of the hiatus time period of another device. Alternatively, the receiving device may postpone sending the internal hiatus declaration until another device finishes its hiatus period.

In an embodiment, the receiving device receives a request to provide secure services to a new member in a group of devices. For example, the receiving device may receive a request to provide a new key to members of the group because a new member joined the group. In response to receiving such a request, the receiving device may postpone servicing the request until the device becomes communicable, and delay distribution of a new key until then.

In an embodiment, a non-transitory computer-readable storage medium stores one or more sequences of instructions which, when executed by one or more processors, cause the one or more processors to perform the processes described herein.

In an embodiment, an apparatus comprises one or more processors, hiatus processing logic and a non-transitory computer-readable storage medium storing one or more sequences of instructions. The hiatus processing logic is coupled to the processors and is configured to send and receive one or more units of information and to implement the processes described herein.

2.0 Structural and Functional Overview

Figure 1:
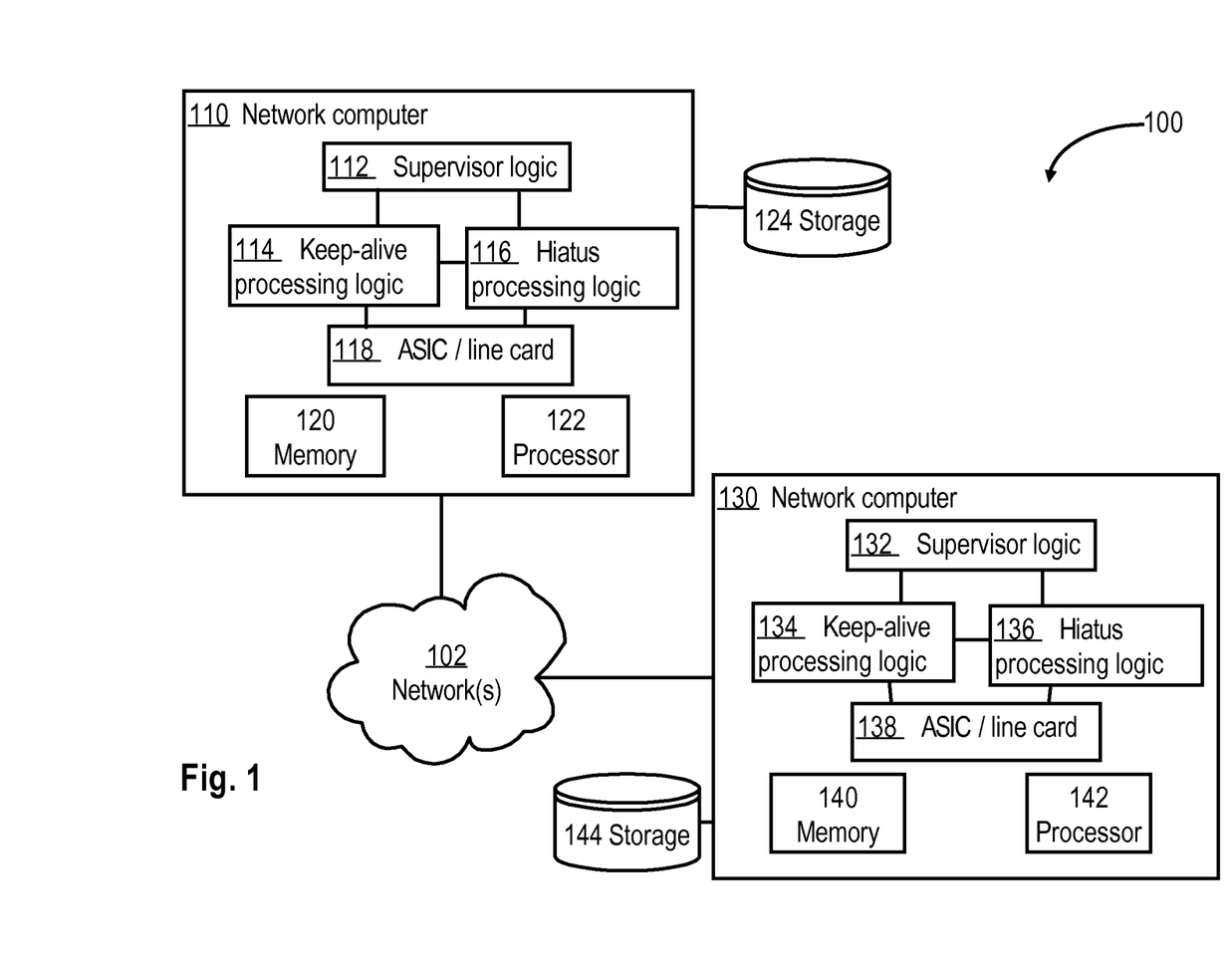
FIG. 1 illustrates computers communicating via a network.
Figure 2:
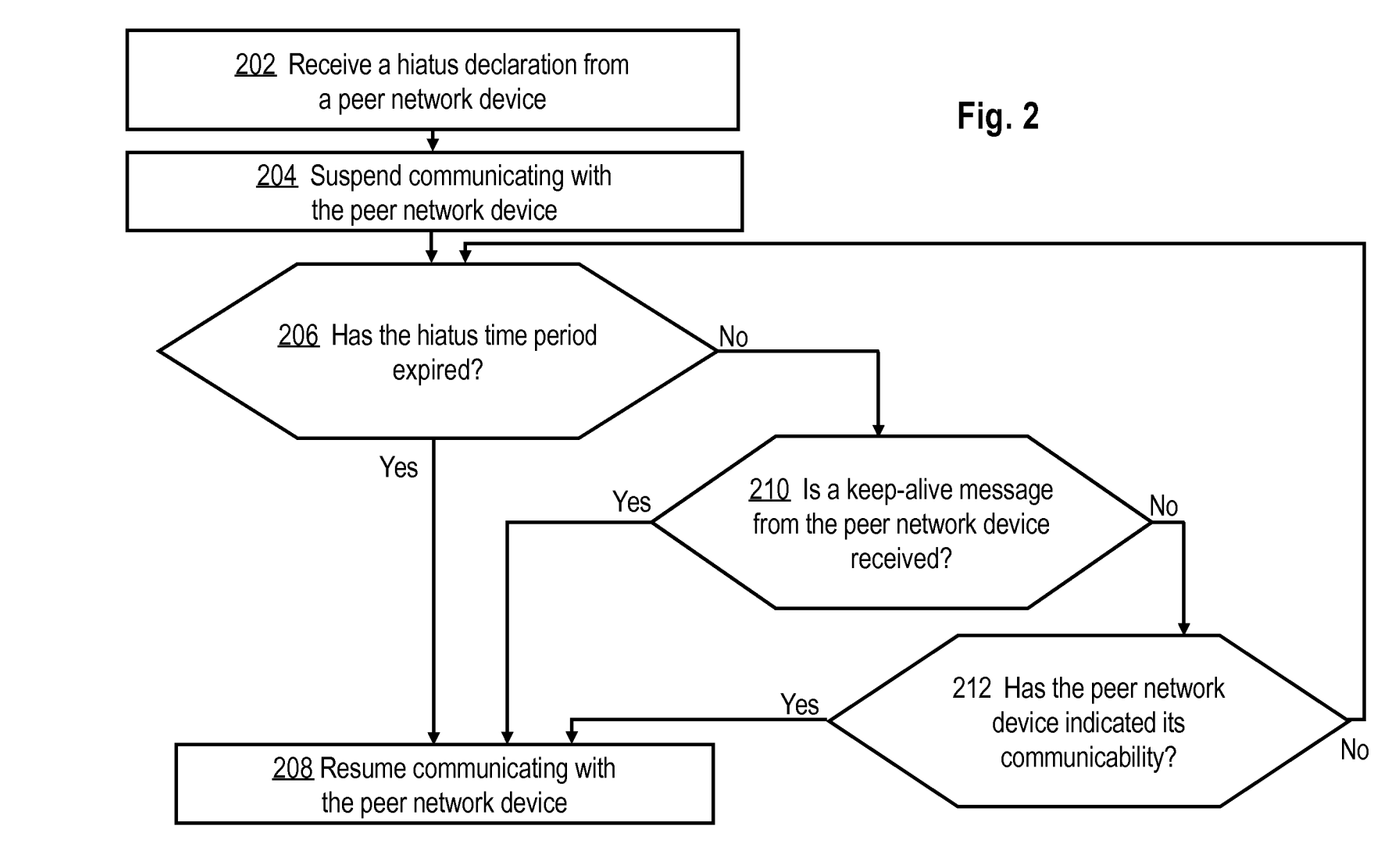
FIG. 2 illustrates a process for managing an external hiatus event.
Figure 3:
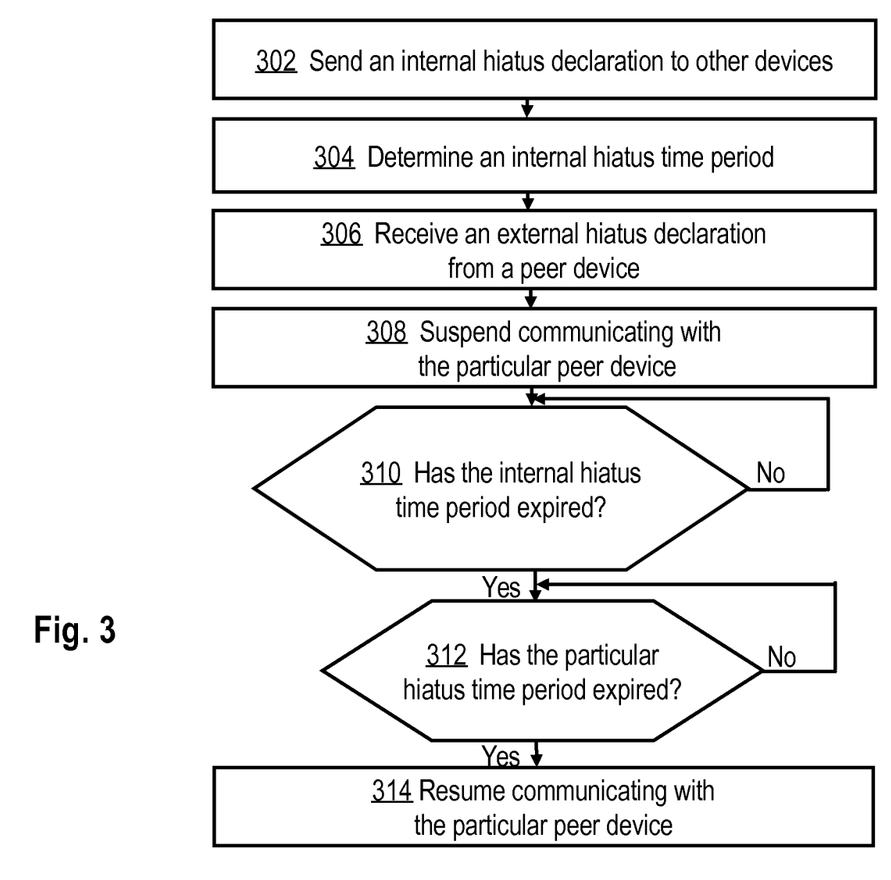
FIG. 3 illustrates a process for managing an internal hiatus event and multiple external hiatus events.
Figure 4:
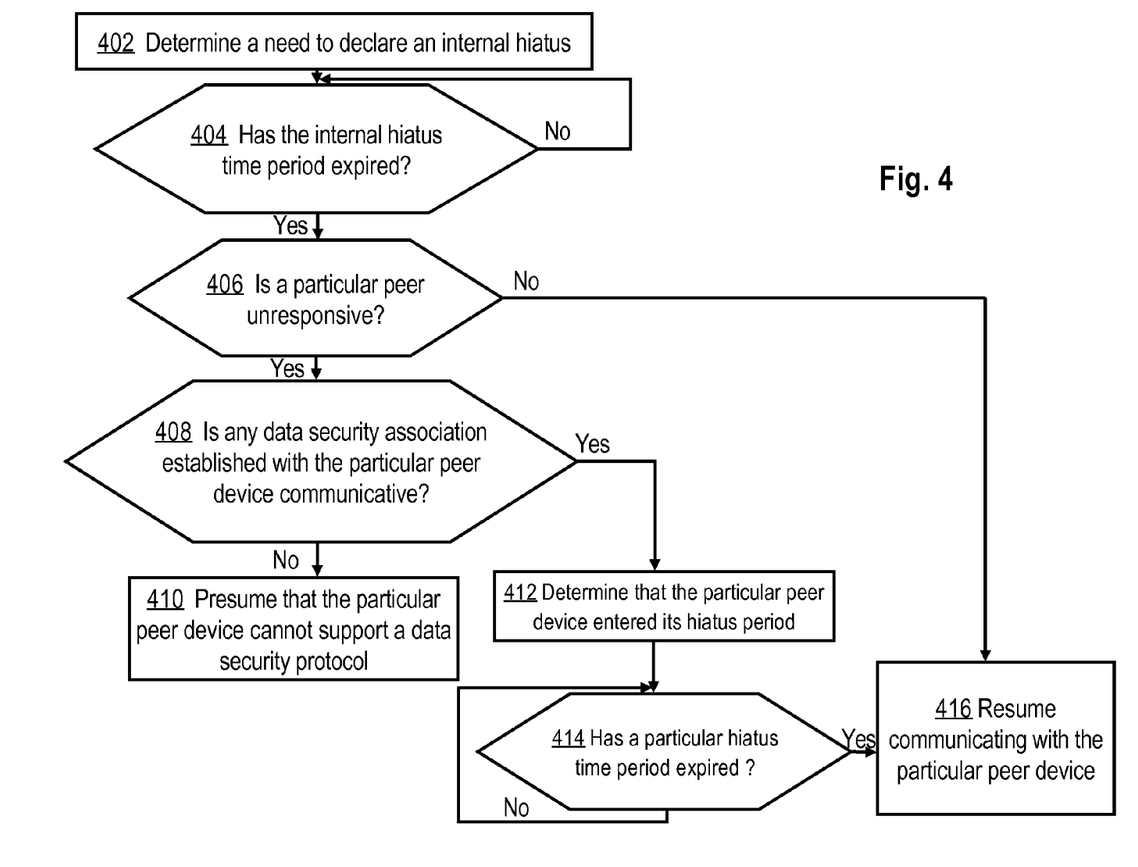
FIG. 4 illustrates a process for managing an internal hiatus event and multiple external hiatus events.
Figure 5:
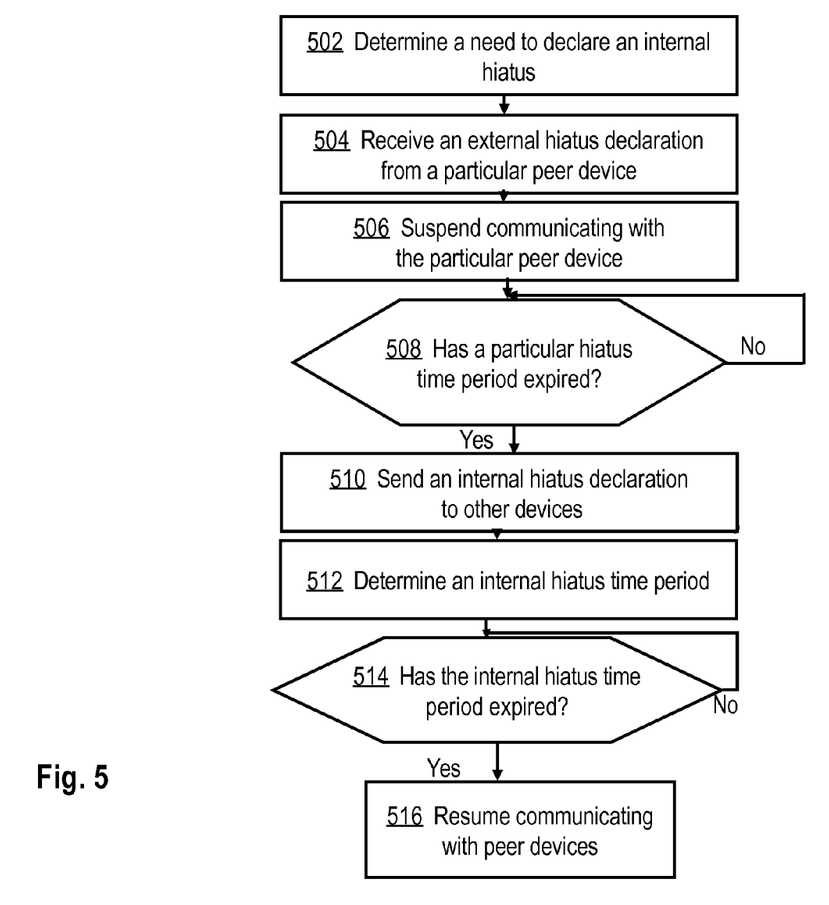
FIG. 5 illustrates a process for managing an internal hiatus event and multiple external hiatus events.
Figure 6:
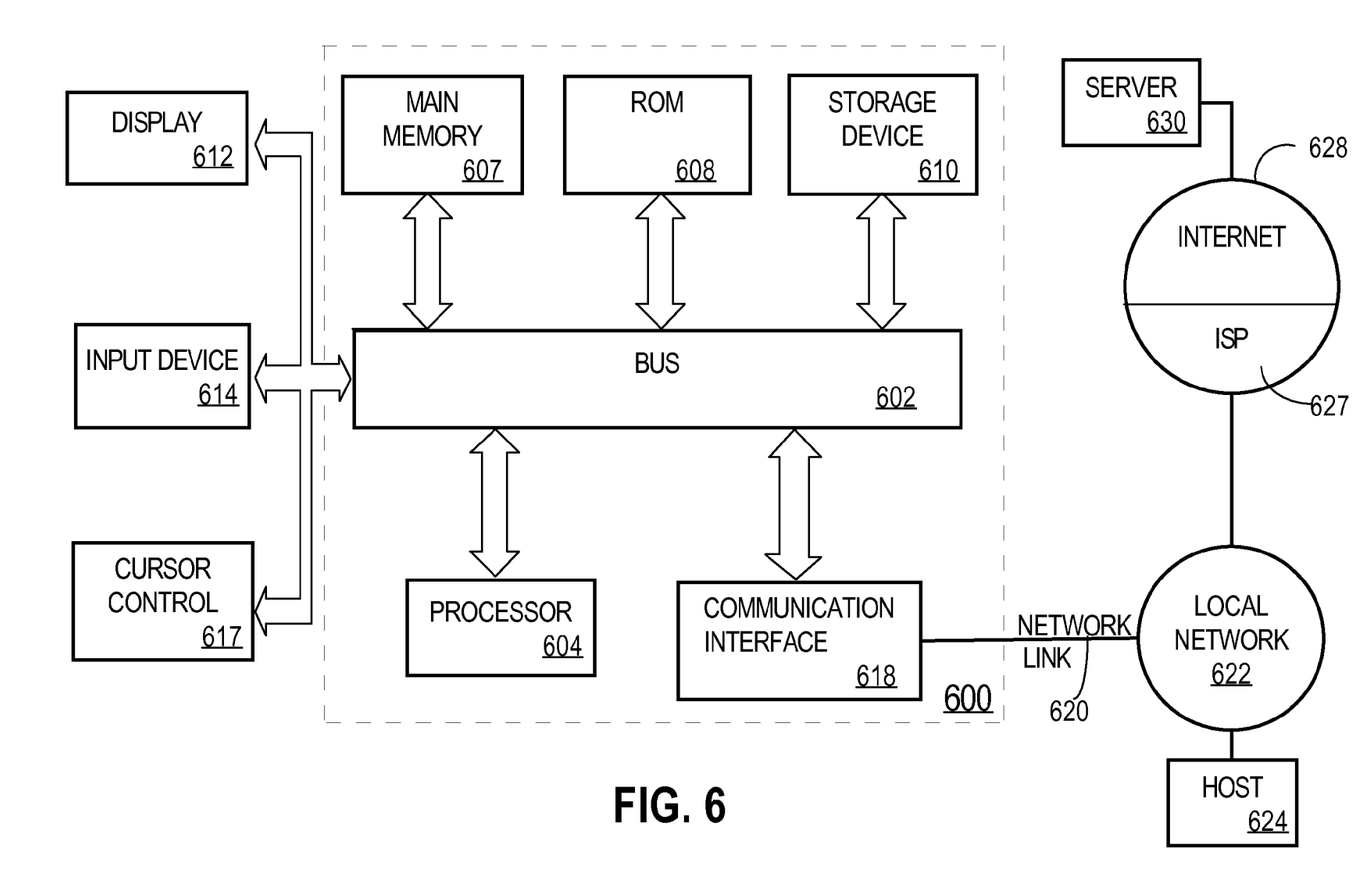
FIG. 6 illustrates a computer system upon which an embodiment may be implemented.

FIG. 1 illustrates computers communicating via a network; FIG. 2 illustrates managing an external hiatus event; FIG. 3, FIG. 4, and FIG. 5 illustrate various embodiments of managing an internal hiatus event and multiple external hiatus events; FIG. 6 illustrates a computer system upon which an embodiment may be implemented.

Referring first to FIG. 1, in an embodiment, a computer cluster 100 comprises one or more network computers 110, 130 that may communicate directly or indirectly through one or more communications links and a network 102. Network computers 110, 130 may be connected in a series, in a ring, according to any combination of series and rings, and/or according to any other topology. The communications links may be unidirectional or bidirectional. The communication links may be implemented using any of several technologies such as wireless, wired, and optical links.

For purposes of illustrating clear examples, FIG. 1 shows two network computers 110, 130. However, practical embodiments may use any number of network computers 110, 130. In an embodiment, computer cluster 100 is an IEEE 801 compliant network and comprises a topology of any number of point-to-point links, LANs, and/or MANs.

Network computers 110, 130 comprise, in various embodiments, one or more processors, one or more memory units, one or more ASIC hardware boards or any type of line cards, one or more processing logic, one or more supervisor logic and other components specific to the system implementation. Each of the network computers 110, 130 may be structured as shown in FIG. 6. Examples of network computers 110, 130 include group key distribution stations, network management stations, general-purpose computers, access servers, routers, and distributed switches such as Cisco Nexus 7000 series or Cisco Catalyst 6500 series from Cisco Systems, Inc., San Jose, Calif.

In an embodiment, a network computer 110 (or 130) comprises one or more instances of each of the following: a processor 122 (142), a memory 120 (140), a supervisor logic 112 (132) a keep-alive logic 114 (134), a hiatus processing logic 116 (136), one or more application-specific integrated circuits (ASIC) or line cards 118 (138) and a storage unit 124 (144). For purposes of illustrating clear examples, FIG. 1 shows one instance of memory 120, one instance of processor 122, one instance of storage unit 124. However, practical embodiments may use any number of instances of memory 120, any number of instances of processor 122, and any number of storage units 124.

In an embodiment, storage unit 124 may be local with respect to network computer 110, or remote with respect to network computer 110, as depicted in FIG. 1. Storage unit 124 may be any of volatile or non-volatile storage medium, and may be provided by various vendors and manufacturers. In an embodiment, storage unit 124 may include additional storage devices, printing equipment, faxing/copying equipment or any other types of resources.

In an embodiment, memory 120 may comprise any of RAM, ASIC, ROM and disk.

Network computer 110 may be implemented as a special-purpose computer, general purpose computer, using hardware logic such as in an application-specific integrated circuit (ASIC) or field-programmable gate array (FPGA), system-on-a-chip (SoC), or other combinations of hardware, firmware and/or software. ASIC hardware may be customized for a particular use, rather then intended for general-purpose circuit installed in network computer 110.

In certain embodiments, network computer 110 comprises a networking infrastructure element such as a router, switch, firewall, or gateway. In some embodiments, network computer 110 may include packet processing logic configured for forwarding, routing, or switching data packets and configured to store, update, and advertise routes, capabilities, and other internetworking information.

Network computer 110 may also host, as part of supervisor logic 112 or in separate logic, one or more agents that implement network management protocols and are configured to perform In-Service Software Upgrade (ISSU) and/or High Availability (HA) that are described below. In certain embodiments, network computer 110 may also host logic to implement various communication protocols, such as MACsec, IEEE 802.1X-2010, MACsec key agreement (MKA) IKE, IPsec, TrustSec, simple network management protocol (SNMP), and other protocols. In other embodiments network computer 110 hosts any other protocol that uses periodic transmission of keep-alive messages or heartbeat messages.

In an embodiment, network computer 110 implements device, system or data security functions and provides facilities to communicate information via network 102 to and from other network computers in cluster 100.

In an embodiment, supervisor logic 112 is configured to execute or invoke one or more other computer programs or software elements stored in memory 120 or storage 124. For example, supervisor logic 112 may execute instructions from an operating system, various software applications, programs configured to call an application programming interface (API) of the operating system and other programs available to supervisor logic 112.

In an embodiment, network computer 110 may host, as part of supervisor logic 112 or in separate logic, one or more agents that implement key management protocols, such as key management protocols for IEEE 802.1X, to provide port-based network access control to devices in computer cluster 100. Port-based network access control regulates access to the network, guarding against transmission and reception by unidentified or unauthorized parties, and consequent network disruption, theft or service, or data loss.

In an embodiment, supervisor logic 112 manages various aspects of data security of data transmitted from and to network computer 110. The key management aspects are managed by one or more key management methods, which meet requirements of a group of computers that belong to either the whole computer cluster 100 or to a sub-network of the cluster 100.

In an embodiment, supervisor logic 112 distributes and manages various security keys in compliance with the MACsec Key Agreement (MKA) protocol defined within the IEEE 801.1X protocol. For example, supervisor logic 112 uses MKA to distribute a Connectivity Association Key (CAK) and Secure Association Keys (SAK). Any device in computer cluster 100 may act as a key server. Connectivity Association Keys (CAK) also may be generated and distributed by a dedicated device.

In an embodiment, network computer 110 sends various messages in compliance with the MACsec Key Agreement (MKA) protocol. Some of the messages are used to negotiate which station or stations should distribute a new SAK due to a group membership change. Other messages may be used to distribute actual SAKs and CAKs. Other messages may be sent to update computers about current status of a device, including keep-alive messages. According to MKA, an indication whether a device is active may be sent in any each MKA message.

In an embodiment, network computer 110 belongs to a group of devices that share security keys, and is dedicated to generate and distribute a CAK to the group. For example, if network computers 110, 130 are in a group of devices that share the same CAK, then supervisor logic 112 or other logic of network computer 110 may be responsible for generating and distributing the CAK to the group.

Depending on local policy, an election process may be used to select one station to act as a key server. Once such a station is selected, the station distributes a SAK to other devices in a cluster. For example, if network computer 110 is chosen to distribute a SAK, then supervisor logic 112 or separate logic of network computer 110 may distribute the SAK. In some implementations, a CAK and SAK might be distributed by the same device.

In an embodiment, supervisor logic 112 executes functions native to an authenticator and distributor of a CAK to a computer in the role of a supplicant. For example, the authenticator initiates communications with the supplicant in accordance with the MKA protocol, detects that the supplicant is active and sends a CAK to the supplicant. In response to receiving the CAK, the supplicant installs the received CAK, sends an acknowledgment to the authenticator. Upon receiving the acknowledgment from the supplicant, the authenticator assumes that the supplicant has accepted the CAK, and proceeds to distribute a SAK.

In an embodiment, supervisor logic 112 executes functions of a distributor of a SAK to another computer, which may be termed a peer computer. For example, the distributor sends periodic MKA messages to the computer to detect whether the computer is active. If the computer is active and receives a MKA message from the distributor, the computer creates its own MKA message and sends the MKA message to the distributor.

Upon receiving the MKA message, the distributor determines that the computer is active and distributes a SAK, which the computer receives, and installs. Subsequently, the distributor creates a new SAK to be used in the future.

In an embodiment, keep-alive processing logic 114 is executed by one or more instances of processors 122 and utilizes one or more instances of memory 120 and one or more storage units 124. Keep-alive processing logic 114 generates and disseminates keep-alive messages. Keep-alive processing logic 114 collaborates with supervisor logic 112 or other logic units implemented in network computer 110.

In an embodiment, keep-alive processing logic 114 is responsible for communicating an activity state to computers in the computer cluster 100. Computers in cluster 100 need to know which devices are actively participating in the exchange before the devices can be trusted. The activity state facilitates various aspects of synchronization between the devices in the cluster and may be communicated in MKA messages.

In an embodiment, keep-alive processing logic 114 maintains and distributes one or more activity state parameters. For example, a parameter may include a dynamic member identifier (MI) which identifies network computer 110. Another parameter may include a message number (MN) and is used as a sequence number associated with MKA messages sent by network computer 110. Other parameters may include a list of MI/MN values that indicate the devices that are active or a list of MI/MN values that indicate the devices that are potentially active.

In an embodiment, upon installing a security key and initiating secure transactions with other computers, network computer 110 may determine that another network computer 130 has stopped sending keep-alive messages. In response, in conventional practice, network computer 110 might determine that network computer 130 cannot participate in a data security protocol and/or that a previously exchanged security key cannot be used by network computer 110. The network computer 130 would have to generate a new security key, distribute the new security key to participating computers and exclude network computer 130 from secure communications with network computer 110 until network computer 130 resumes sending keep-alive messages.

To overcome this problem, in an embodiment, network computer 110 acquires knowledge from network computer 130 that network computer 130 can still participate in a data security protocol even though it cannot emit keep-alive messages. For example, network computer 130 may be able to continue processing and switching data packets in compliance with the data security protocol even though network computer 130 is undergoing In-Service Software Upgrade (ISSU) of a line card and therefore cannot send keep-alive messages. For example, the line card of network computer 130 might be fully capable of performing data security functions while supervisor logic 112 is reloaded.

As another example, network computer 130 notifies network computer 110 (and/or other computers in a network) that the network computer 130 is still capable of performing data security yet unable to send keep-alive messages due to a failing-over period, during which one processor of network computer 130 takes over functions of another processor.

In an embodiment, network computer 130 uses hiatus processing logic 136 to generate and emit notifications. Network computer 110 uses hiatus processing logic 116 to process received notifications and to generate and emit notifications directed to network computer 130 or others.

In an embodiment, hiatus processing logic 116 is responsible for generating one or more hiatus declarations and sending the declarations to other computers in a network. The term "hiatus" refers to any pause, time away or break from generating or emitting keep-alive or heartbeat messages as part of a protocol or operation that uses such messages. A computer sends a hiatus declaration to indicate that the computer is pausing emission of keep-alive messages but that the computer remains active and continues to participate in, for example, a data security protocol.

In an embodiment, hiatus processing logic 116 determines whether network computer 110 should declare an internal hiatus, during which network computer 110 is unable to emit keep-alive messages, but capable of participating in a data security protocol. If network computer 110 declares an internal hiatus, then hiatus processing logic 116 sends a hiatus declaration to other modules within the same computer and to other computers.

A hiatus declaration may include data indicating an identity of the computer. Optionally, the hiatus declaration may include data indicating a hiatus time period specifying a length or duration of the hiatus, and/or a hiatus starting time, which indicates when the computer will start the hiatus.

In an embodiment, the hiatus processing logic 116 receives one or more external hiatus declarations from other computers. Upon receiving an external hiatus declaration, the hiatus processing logic 116 determines the duration of the external hiatus, and whether the external hiatus of the device starts immediately or at a future time.

Thus hiatus declarations may be made actively to protect against unscheduled HA or other unscheduled events. Devices in a network also could declare hiatus periods according to scheduled outages or software upgrades and resume normal keep-alive processing as soon as their corresponding hiatus periods expire. Alternatively, the hiatus could be declared in the absence of a scheduled outage, relieving a device from sending keep-alive messages according to a usual schedule, to reduce the amount of necessary keep-alive processing. For example, this approach could be used in pair-wise MACsec/MKA connections with long-lived MACsec SAs.

3.0 Process of Managing an External Hiatus Event

In an embodiment, when a network device is about to undergo a software outage, for example, due to an ISSU or HA event, the device is configured to notify other devices in the network that a hiatus will occur in sending keep-alive messages. Upon receiving such a notification, other devices update local state data and do not expect to receive keep-alive messages from the device during a hiatus period, which may be explicitly communicated by the device, or set to a default period. The default period may be defined locally by recipients of the notification.

In an embodiment, before a scheduled outage, an ISSU event, or an HA event, a device sends a notification declaring the ability to support a data security protocol. The notification may be sent as a hiatus declaration, and may comprise various flags and parameter values, such as an explicit hiatus time period duration. The hiatus declaration may be sent in a last keep-alive message that the device was able to generate and emit before entering a hiatus period, or in messages that comply with the data security protocol, such as MACsec or IPsec.

In response, for participating in the data security protocol, the receivers of the hiatus declaration continue to treat the device as active in some aspects, although no keep-alive messages are expected from the device. Upon expiration of the hiatus period of the device, the receivers assume that the device can communicate, and resume communicating with the device.

In an embodiment, a hiatus of a device ends upon expiration of the hiatus time period. In an embodiment, a device may end a hiatus before expiration of the associated hiatus time period. For example, a device may indicate that the device has ended its hiatus before expiration of the hiatus time period by sending a keep-alive message before the expiration of the hiatus time period, or an explicit message to indicate that the device has finished its hiatus and that the device has resumed ordinary keep-alive processing.

Referring now to FIG. 2, in an embodiment, a process of managing an external hiatus declaration by a network device is described. For purposes of illustrating a clear example, FIG. 2 is described in the context of a distributed switch that is configured to perform ISSU operations and uses data transmission protocols such as MACsec and IEEE 802.1X-2010.

In other embodiments, a computer implementing FIG. 2 may comprise any of the computers identified above with reference to FIG. 1.

In step 202, a receiving device receives a hiatus declaration from another network device. The hiatus declaration may be generated and emitted by one device in a network at the time. Alternatively, two or more devices may declare their hiatus periods and emit corresponding external hiatus declarations to other devices at about the same time.

For purposes of illustrating a clear example, FIG. 2 shows a process for one receiving device that receives one hiatus declaration from one other device. However, practical embodiments may use any number of receiving devices, any number of hiatus declarations, and any number of other devices emitting hiatus declarations.

In an embodiment, a hiatus declaration is a message encapsulated in a keep-alive message. For example, the hiatus declaration may be encapsulated in a keep-alive data packet that complies with a data communications protocol specific to the network. In particular, the hiatus declaration may be sent in a payload of a keep-alive data packet, segment or message of another protocol. While certain embodiments may be used in connection with MACsec or IPsec, the hiatus approach herein also may be applied to TCP data segments.

In an embodiment, a hiatus declaration is formatted as a proprietary MACsec key agreement (MKA) parameter. Alternatively, the hiatus declaration is included as an Organizationally Specific type-length-value (TLV) attribute of an IEEE 802.1X-2010 Announcement included in the MKA message, to comply with the IEEE 802.1X-2010 standard. In 802.1X-2010, an MKA message may comprise a hiatus-related MKA flag and a hiatus-related MKA parameter value. Examples of hiatus-related MKA flags include FIN and RKEY. Examples of hiatus-related MKA parameter values include a hiatus time period value.

In an embodiment, if the flag "FIN" is set in an MKA message, then a device sending the MKA message communicates to other devices that the device ended its hiatus period. If the flag "FIN" is set in the MKA message, then a corresponding MKA parameter value might be set to zero seconds since the message does not declare a new hiatus period.

In an embodiment, if the flag "RKEY" is set in an MKA message, then a device sending the MKA message announces its intent to take a hiatus and requests a rekey. If the flag "RKEY" is set, then a corresponding MKA parameter value might be set to zero seconds since the device is not declaring the hiatus yet.

In an embodiment, in 802.1X-2010, hiatus flags and hiatus parameters are sent in a TLV element. A TLV element may comprise a field "TLV type" that indicates the TLV element type; a field "TLV length" that indicates a length in bytes of the hiatus time period value; and a value field that contains value of the hiatus time period, usually expressed in seconds.

In an embodiment, a hiatus declaration is encapsulated in an IPsec message that complies with the IKE standard. For example, a Notify message type of "IKE_HIATUS" or a similar type may be used to communicate that an IKE module may be unresponsive for a specified time due to a scheduled non-responsive outage or other reason. The IKE Notify message also may contain flags or fields for parameters such as hiatus time period.

In an embodiment, a hiatus declaration contains data that identifies the device that sent the hiatus declaration. For example, the hiatus declaration may identify the device by the IP address, the host name, or other identification sufficient to indicate the device.

In an embodiment, a hiatus declaration contains data that identifies a hiatus time period during which the device will not provide keep-alive messages. For example, the hiatus time period may be expressed in terms of an integer number or a real number that represents a number of seconds, or other time units, during which the device is unable to generate and emit the keep-alive messages.

In an embodiment, a hiatus declaration also contains data that indicates a future time at which the device will start a hiatus. For example, the device might send a hiatus declaration with both a hiatus starting time and a hiatus time period. In an embodiment, a hiatus declaration does not contain a hiatus starting time. If the hiatus starting time is not defined in the hiatus declaration, then a receiving device may assume that the device has already entered a hiatus.

In an embodiment, a hiatus declaration does not contain a hiatus time period specifying a length of the hiatus. If the hiatus time period is not defined in the hiatus declaration, then a receiving device determines the hiatus time period using its own settings and data. For example, the receiving device may assume that each time the receiving device receives a hiatus declaration that does not specify a hiatus time period, the receiving device sets the hiatus time period internally to a predefined value.

In step 204, upon receiving a hiatus declaration from a device, the receiving device suspends at least part of its communications with the other device. For example, the receiving device might suspend forwarding key management packets to the other device. However, the receiving device might continue reliance on keys that have been exchanged between the receiving device and the other device, thus continue support of MACsec, IPsec or other data security protocol that is utilized by the network devices.

In step 206, the receiving device periodically checks whether a hiatus time period associated with the received hiatus declaration expires. The hiatus time period may be communicated by the other device in the hiatus declaration. Alternatively, the hiatus time period may be defined by the receiving device itself.

If, in step 206, the receiving device determines that the hiatus time period of the other device has expired, then in step 208 the receiving device assumes that the other device ended its hiatus and the receiving device resumes communicating with the other device.

However, if, in step 206, the receiving device determines that the hiatus time period of the device has not expired, then in step 210 the receiving device checks whether the other device has sent a new keep-alive message even though the hiatus time period has not expired yet. If the other device has sent a keep-alive message before expiration of the hiatus time period, the receiving device may assume that the other device finished its hiatus ahead of a schedule. Therefore, upon receiving at least one new keep-alive message from the other device, the receiving device assumes that the device ended its hiatus, proceeds to step 208 and resumes communicating with the other device.

If, in step 210, the receiving device determines that no new keep-alive messages were received from the other device since the other device declared its hiatus, then in step 212 the receiving device checks whether the other device has indicated in any other way that it ended its hiatus. If such an indication has been received, then the receiving device proceeds to step 208 and resumes communicating with the other device.

If, in step 212, the receiving device determines that no indication of communicability has been received from the other device, then the receiving device proceeds to step 206 and checks again whether the hiatus time period for the other device has expired.

The steps 206, 210, 212 are performed until the receiving device determines that at least one of the conditions for ending the hiatus of the other device is satisfied.

In an embodiment, the network device may implement various mechanisms for preventing and detecting indefinite looping in steps 206, 210, 212. For example, timeouts may be used.

4.0 Managing an Internal Hiatus Event and Multiple External Hiatus Events

FIG. 3, FIG. 4, FIG. 5 illustrate various embodiments of managing an internal hiatus event and multiple external hiatus events. Referring first to FIG. 3, in step 302, in an embodiment, a network device determines to start an internal hiatus and sends an internal hiatus declaration to one or more other devices. The network device may send the internal hiatus declaration encapsulated in a keep-alive message. In another embodiment, the network device encapsulates the internal hiatus declaration in a MKA message in compliance with IEEE 802.1X. In another embodiment, the network device encapsulates the internal hiatus declaration in an IKE message in compliance with the IPsec protocol.

In step 304, the network device determines an internal hiatus time period during which the network device plans not to send keep-alive messages, but otherwise remain capable of processing security tasks. Upon determining the internal hiatus time period, the network device starts the hiatus by suspending communication with a particular peer device as shown at step 308, and generally remains in hiatus with respect to keep-alive messages until the internal hiatus time period expires.

Additionally or alternatively, at step 306, the network device may receive an external hiatus declaration from another device, and in response to receiving the external hiatus declaration, the network device suspends its communications with the other device as shown at step 308. For purposes of illustrating a clear example, step 306 indicates receiving one external hiatus declaration from one other device. However, practical embodiments may use any number of external hiatus declarations received from any number of devices.

The network device may receive one or more external hiatus declarations from other device(s) that declare hiatus periods. The other devices may send hiatus declarations to prevent the network device from assuming that the other devices are unable to participate in a data security protocol, for example.

A hiatus declaration may be related to and include information about other events. For example, in the event of refreshing the data security keys, information about the refreshing the data security keys may accompany a hiatus notification. The rekey request could be combined with the hiatus declaration, or could be independent from the hiatus declaration. The rekey request may coincide with the hiatus notification. In either case, the rekey event may result in establishing a new effective data security association that has a lifetime that is longer than a scheduled outage of the device sending the hiatus declaration.

In an embodiment, synchronization issues are addressed. It is possible that more than one device communicating in a data security protocol will be configured for a scheduled outage at about the same time, and that more than one device will be receiving new software from a management station at about the same time. Therefore, more than one device might have to declare their hiatus periods to upgrade their software at about the same time.

According to the approach depicted in FIG. 3, in an embodiment, synchronization of multiple hiatus periods is resolved by forcing the device that received an external hiatus declaration from a device to postpone its communications with the devices until both, the internal hiatus period and the external hiatus period expire. This approach provides the devices with a sufficient amount of time to complete upgrades without being considered non-responsive by other devices.

In step 310, the network device checks whether the internal hiatus time period of the network device has expired. If the internal hiatus period has expired, then the network device proceeds to step 312. Otherwise, the network device awaits the expiration of the internal hiatus period.

In step 312, the network device checks whether the external hiatus period of the device has expired. If the external hiatus period has expired, then the network device resumes communicating with the other device. Otherwise, the network device continues to determine whether the external hiatus of the other device has expired.

In an embodiment, the network device may implement various mechanisms for preventing and detecting indefinite looping in steps 310, 312.

Referring now to FIG. 4, in an embodiment, synchronization of multiple hiatus periods is resolved generally by interrogating an unresponsive device and assuming that keep-alive messages are not expected from the particular device until expiration of the hiatus period.

In step 402, a network device determines a need to declare an internal hiatus period as described in detail above. In step 404, the network device checks whether the internal hiatus time period of the hiatus of the network device has expired. If so, the network device proceeds to perform step 406. Otherwise, the network device awaits expiration of the internal hiatus time period.

When the network device returns from its hiatus, in step 406, the network device interrogates other devices to determine whether the other devices are responsive. If, in step 406, the network device finds a particular other device to be unresponsive, the network device may further interrogate the particular other device to determine whether data security associations established with the particular other device are fully communicating with the network device. If any of the data security associations established with the particular other device is non-communicative, then, in step 410, the network device presumes that the particular other device cannot support a data security protocol and undertakes one or more responsive actions, such as computing new paths, establishing new data security associations, requesting new keys, etc.

However, if, in step 408, the network device determines that data security associations established with the particular other device are fully communicative, then, in step 412, the network device assumes that the particular other device has started a hiatus. This might be a situation in which the particular other device is undergoing a software upgrade and the particular other device either did not have a chance to send a hiatus declaration to other computers, or sent a hiatus declaration but, for some reason, the network device has not received the hiatus declaration. In any event, the network device determines that the particular other device might be in a hiatus, determines a particular hiatus time period for the hiatus of the particular other device and proceeds to step 414.

In step 414, the network device checks whether the particular hiatus time period for the hiatus of the particular other device has expired. If the particular hiatus time period has expired, the network device assumes that the particular other device ended its hiatus period and the network device resumes full communication with the particular other device as shown in step 416.

In an embodiment, before resuming full communication with the particular other device, the network device repeats interrogating the particular other device to make sure that the particular other device is indeed fully responsive and capable of performing all expected tasks. However, if the particular hiatus time period for the hiatus of the particular other device has not expired, the network device continues checking a status of the hiatus of the particular device until either the particular hiatus time period expires, or the particular device sends any indication that the particular device has ended its hiatus.

In an embodiment, the network device may implement various mechanisms for preventing and detecting indefinite looping in steps 404, 406, 408, 414.

Referring now to FIG. 5, in an embodiment, synchronization of multiple hiatus periods is resolved by postponing an internal hiatus by a network device until expiration of hiatus periods of devices. In this case, it is assumed that keep-alive messages are not expected from a particular device until expiration of either an internal hiatus time period of the network device or an external hiatus time period of the particular device, whichever happens later.

One example of postponing internal hiatus period is when active devices delay their outages until the devices that have already entered their hiatus periods resume communicating with the network. At that time, one of the live devices may declare a hiatus and determine a hiatus time period.

In the case of a group data security association, a tie-breaker mechanism may be required to determine an order in which live devices should declare hiatus periods. In an embodiment, in the case of MACsec, it is convenient to use an existing key-server election state as a tie-breaker mechanism. This approach may use IEEE 802.1X-2010 to delay, for example, an ISSU start time.

Another example of postponing internal hiatus period is when an additional device joins a security association group. When a group of multiple cooperating devices shares a security association, it is possible for an additional device to join the group while one of the existing members is in its hiatus period. The existing member has most likely already signaled its hiatus period by sending a hiatus declaration and has already entered its hiatus. However, in the case of MACsec, IEEE 802.1X-2010 includes a requirement that the group key be changed when a new device joins the group. This requirement upholds an AES-GCM security condition.

In one embodiment, to address potential inability to change the group key as soon as the new device joins the group because one of the existing members is in a hiatus period, the distribution of a new key is delayed until the existing member completes the hiatus period. Alternatively, the group key may be changed without waiting until the particular member to finish the hiatus period.

Referring again to FIG. 5, in step 502, in an embodiment, a network device determines a need to declare in an internal hiatus. Example reasons for declaring an internal hiatus are described above. In step 504, the network device receives an external hiatus declaration from a particular device. For purposes of illustrating a clear example, step 504 shows the network device receiving one external hiatus declaration from one device. However, practical embodiments may use any number of external hiatus declarations received from any number of devices.

In step 506, the network device suspends communicating with the particular device, and in step 508, the network device checks whether a particular hiatus time period associated with the hiatus of the particular device has expired. If the particular hiatus time period has expired, then the network device proceeds to step 510. However, if the particular hiatus time period has not expired, the network device continues waiting for an end of the particular hiatus time period.

If the particular hiatus time period has expired, then in step 510, the network device declares own hiatus and sends an internal hiatus declaration to one or more other devices. In step 512, the network device determines an internal hiatus time period and initiates the hiatus. During the internal hiatus period, the network device may perform scheduled software upgrades or other tasks.

In step 514, the network device tests whether the internal hiatus time period has expired. If the internal hiatus time period has expired, then in step 516 the network device resumes communicating with devices in the network. For example, the network device may distribute a new key to the group of devices. In an embodiment, if the internal hiatus time period has not expired, but the network device has received another indication that the network device has completed the scheduled task, the network device proceeds to step 516 and resumes communicating with the devices. However, if the network device determines that the internal hiatus time period has not expired and that a scheduled task is still in progress, then the network device proceeds to step 514, in which the network device awaits expiration of the internal hiatus time period.

In an embodiment, the network device may implement various mechanisms for preventing and detecting indefinite looping in steps 508, 514.

5.0 Implementation Mechanisms—Hardware Overview

FIG. 6 is a block diagram that illustrates a computer system 600 upon which an embodiment of the invention may be implemented. The embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to the computer system 600 using the interface 618. Firmware or software running in the computer system 600 provides a terminal interface or character-based command interface so that external commands can be given to the computer system.

Communication interface 618 may be coupled to one or more external network elements. The external network elements may include a local network 622 coupled to one or more hosts 624, or a global network such as Internet 628 having one or more servers 630.

According to one embodiment, the techniques herein are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 604 for execution. Such a medium may take many forms, including but not limited to, non-transitory and non-volatile storage media and non-transitory volatile storage media. Non-volatile storage media includes, for example, optical or magnetic disks, such as storage device 610. Volatile storage media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 627. ISP 627 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for compliance management as described herein. The received code may be executed by processor 604 as it is received, and/or stored in storage device 610, or other non-volatile storage for later execution.

6.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

7.0 Additional Disclosure

1. An apparatus, comprising: one or more processors; hiatus processing logic coupled to the one or more processors and configured to send and receive one or more units of information; a non-transitory computer-readable storage medium comprising one or more stored sequences of instructions which, when executed by the one or more processors, cause the one or more processors to perform: receiving, from a network device, a hiatus declaration that indicates that the network device is expected to be incommunicable; suspending communicating with the network device until expiration of a hiatus time period during which the network device is expected to be incommunicable; resuming communicating with the network device upon determining that the hiatus time period has expired, or upon receiving a keep-alive message from the network device or other indication that the network device ended its incommunicability.

2. The apparatus of claim 1, wherein the hiatus declaration further comprises the hiatus time period that indicates how long the network device is expected to be incommunicable, and a hiatus start time that indicates when the network device is expected to become incommunicable.

3. The apparatus of claim 1, wherein the non-transitory computer-readable storage medium further comprises instruction which, when executed, cause postponing an internal hiatus until the network device is communicable; sending an internal hiatus declaration to the network device after the network device is communicable.

4. The apparatus of claim 1, wherein the non-transitory computer-readable storage medium further comprises instructions which, when executed, cause receiving a request to provide secure services to a new member in a group; postponing servicing the request until the network device is determined to be communicable; wherein the network device provides secure transactions for members of the group.

5. The apparatus of claim 1, wherein the non-transitory computer-readable storage medium further comprises instructions which, when executed, cause delaying distribution of a new key until the network device becomes communicable.

6. An apparatus, comprising: one or more processors; hiatus processing logic coupled to the one or more processors and configured to send and receive one or more units of information; a non-transitory computer-readable storage medium comprising one or more stored sequences of instructions which, when executed by the one or more processors, cause the one or more processors to perform: sending, to one or more network devices, an internal hiatus declaration indicating incommunicability; determining an internal hiatus time period of incommunicability; receiving an external hiatus declaration, from a particular network device from the one or more network devices, indicating that the particular network device is expected to become incommunicable; determine a particular hiatus time period during which the particular network device is expected to be incommunicable; in response to determining that both the internal hiatus time period and the particular hiatus time period associated expired, resuming communicating with the particular network device.

7. The apparatus of claim 6, wherein the external hiatus declaration further comprises the particular hiatus time period that indicates how long the particular network device is expected to be incommunicable, and a particular hiatus start time that indicates when the particular network device is expected to become incommunicable.

8. The apparatus of claim 6, wherein the non-transitory computer-readable storage medium further comprises instruction which, when executed, cause: extending the internal hiatus time period until the particular network device is communicable; resending the internal hiatus declaration to the one or more network devices after the particular network device is communicable.

9. The apparatus of claim 6, wherein the non-transitory computer-readable storage medium further comprises instructions which, when executed, cause: receiving a request to provide secure services to a new member in a group; postponing servicing the request until the particular network device is determined to be communicable; wherein the particular network device provides secure transactions for members of the group.

10. The apparatus of claim 6, wherein the non-transitory computer-readable storage medium further comprises instructions which, when executed, cause delaying distribution of a new key until the particular network device becomes communicable.

11. An apparatus, comprising: one or more processors; hiatus processing logic coupled to the one or more processors and configured to send and receive one or more units of information; a non-transitory computer-readable storage medium comprising one or more stored sequences of instructions which, when executed by the one or more processors, cause the one or more processors to perform: sending, to one or more network devices, an internal hiatus declaration of becoming incommunicable; determining an internal hiatus time period of incommunicability; in response to determining that the internal hiatus time period expired, and in response to determining that a particular network device is unresponsive, determining one or more data security associations established with the particular network device, determining a particular hiatus time period during which the particular network device is expected to become incommunicable, and in response to determining that the particular hiatus time period expired, continuing using the one or more data security associations with the particular network device.

12. The apparatus of claim 11, wherein the internal hiatus declaration further comprises the internal hiatus time period that indicates duration of incommunicability, and an internal hiatus start time that indicates when incommunicability starts.

13. The apparatus of claim 11, wherein the non-transitory computer-readable storage medium further comprises instruction which, when executed, cause: extending the internal hiatus time period until the particular network device is communicable; resending the internal hiatus declaration to the one or more network devices after the particular network device is communicable.

14. The apparatus of claim 11, wherein the non-transitory computer-readable storage medium further comprises instructions which, when executed, cause: receiving a request to provide secure services to a new member in a group; postponing servicing the request until the particular network device is determined to be communicable; wherein the particular network device provides secure transactions for members of the group.

15. The apparatus of claim 11, wherein the non-transitory computer-readable storage medium further comprises instructions which, when executed, cause delaying distribution of a new key until the particular network device becomes communicable.

16. A method, comprising: sending, to one or more network devices, an internal hiatus declaration of becoming incommunicable; determining an internal hiatus time period of incommunicability; in response to determining that the internal hiatus time period expired, and in response to determining that a particular network device is unresponsive, determining one or more data security associations established with the particular network device, determining a particular hiatus time period during which the particular network device is expected to become incommunicable, and in response to determining that the particular hiatus time period expired, continuing using the one or more data security associations with the particular network device; wherein the method is performed by one or more processors.

17. The method of claim 16, wherein the internal hiatus declaration further comprises the internal hiatus time period that indicates duration of incommunicability, and an internal hiatus start time that indicates when incommunicability starts.

18. The method of claim 16, further comprising: extending the internal hiatus time period until the particular network device is communicable; resending the internal hiatus declaration to the one or more network devices after the particular network device is communicable.

19. The method of claim 16, further comprising: receiving a request to provide secure services to a new member in a group; postponing servicing the request until the particular network device is determined to be communicable; wherein the particular network device provides secure transactions for members of the group.

20. The method of claim 16, further comprising delaying distribution of a new key until the particular network device becomes communicable.

21. A non-transitory computer-readable storage medium storing one or more sequences of instructions which, when executed by one or more processors, cause the one or more processors to perform: sending, to one or more network devices, an internal hiatus declaration of becoming incommunicable; determining an internal hiatus time period of incommunicability; in response to determining that the internal hiatus time period expired, and in response to determining that a particular network device is unresponsive, determining one or more data security associations established with the particular network device, determining a particular hiatus time period during which the particular network device is expected to become incommunicable, and in response to determining that the particular hiatus time period expired, continuing using the one or more data security associations with the particular network device.

22. The non-transitory computer-readable storage medium of claim 21, wherein the internal hiatus declaration further comprises the internal hiatus time period that indicates duration of incommunicability, and an internal hiatus start time that indicates when incommunicability starts.

23. The non-transitory computer-readable storage medium of claim 21, wherein the non-transitory computer-readable storage medium further comprises instruction which, when executed, cause: extending the internal hiatus time period until the particular network device is communicable; resending the internal hiatus declaration to the one or more network devices after the particular network device is communicable.

24. The non-transitory computer-readable storage medium of claim 21, wherein the non-transitory computer-readable storage medium further comprises instructions which, when executed, cause: receiving a request to provide secure services to a new member in a group; postponing servicing the request until the particular network device is determined to be communicable; wherein the particular network device provides secure transactions for members of the group.

25. The non-transitory computer-readable storage medium of claim 21, wherein the non-transitory computer-readable storage medium further comprises instructions which, when executed, cause delaying distribution of a new key until the particular network device becomes communicable.

26. An apparatus, comprising: one or more processors; hiatus processing logic coupled to the one or more processors and configured to send and receive one or more units of information; a non-transitory computer-readable storage medium comprising one or more stored sequences of instructions which, when executed by the one or more processors, cause the one or more processors to perform: detecting a need to declare an internal hiatus; receiving an external hiatus declaration from a particular network device, indicating that the particular network device is expected to be incommunicable; suspending communicating with the particular network device until a particular hiatus time period expires; upon expiration of the particular hiatus time period, resuming communicating with the particular device and sending, to one or more network devices, an internal hiatus declaration of becoming incommunicable until the internal hiatus time period expires; suspending communicating with the one or more network devices; in response to determining that the internal hiatus time period expired, resuming communicating with the one or more network devices.

27. The apparatus of claim 26, wherein the internal hiatus declaration further comprises the internal hiatus time period that indicates duration of incommunicability, and an internal hiatus start time that indicates when incommunicability starts.

28. The apparatus of claim 26, wherein the non-transitory computer-readable storage medium further comprises instruction which, when executed, cause: extending the internal hiatus time period until the particular network device is communicable; resending the internal hiatus declaration to the one or more network devices after the particular network device is communicable.

29. The apparatus of claim 26, wherein the non-transitory computer-readable storage medium further comprises instructions which, when executed, cause: receiving a request to provide secure services to a new member in a group; postponing servicing the request until the particular network device is determined to be communicable; wherein the particular network device provides secure transactions for members of the group.

30. The apparatus of claim 26, wherein the non-transitory computer-readable storage medium further comprises instructions which, when executed, cause delaying distribution of a new key until the particular network device becomes communicable.

What is claimed is:

1. A method, comprising:
using a computing device, obtaining an external hiatus declaration from a network device, indicating that the network device will pause emission of BGP KEEPALIVE messages;
suspending communication with the network device until a particular hiatus time period expires;
during the particular hiatus time period, upon receiving a BGP KEEPALIVE message from the network device, even if the particular hiatus time period has not expired, sending, to one or more other network devices, an internal hiatus declaration indicating that the network device will pause communications of BGP KEEPALIVE messages during a specified internal hiatus time period;
suspending communication with the one or more other network devices;
resuming communication with the one or more other network devices even though the internal hiatus time period has not expired by sending BGP KEEPALIVE messages to the one or more other network devices;
wherein the method is performed by one or more computing devices.

2. The method of claim 1, wherein the network device hosts a protocol that periodically transmits a keep-alive message or a heartbeat message.

3. The method of claim 2, wherein the network device will be incommunicable when the network device is incapable of transmitting the keep-alive message or the heartbeat message.

4. The method of claim 1, wherein the internal hiatus declaration further comprises the internal hiatus time period and an internal hiatus start time that indicates when the network device is expected to become incommunicable.

5. The method of claim 1, further comprising: extending the internal hiatus time period until the particular network device is communicable; resending the internal hiatus declaration to the one or more network devices after the particular network device is communicable.

6. The method of claim 1, further comprising: receiving, at the network device that is in a previously declared communications hiatus, a request to provide secure services to a new member in a group; postponing servicing the request until the particular network device is determined to be communicable; wherein the particular network device provides secure transactions for members of the group.

7. The method of claim 1, further comprising delaying distribution of a new key until the particular network device becomes communicable.

8. A non-transitory computer-readable storage medium storing one or more sequences of instructions which, when executed by one or more processors, cause the one or more processors to perform:
detecting a need to declare an internal hiatus due to a particular problem;
receiving an external hiatus declaration from a particular network device, indicating that the particular network device will pause emission of BGP KEEPALIVE messages;
suspending communication with the particular network device until a particular hiatus time period expires;
during the particular hiatus time period, upon receiving a BGP KEEPALIVE message from the particular network device, even if the particular hiatus time period has not expired, sending, to one or more other network devices, an internal hiatus declaration indicating that the network device is becoming incommunicable and will pause emission of BGP KEEPALIVE messages during an internal hiatus time period;
suspending communication with the one or more other network devices;
resuming communication with the one or more other network devices even though the internal hiatus time period has not expired by sending BGP KEEPALIVE messages to the one or more other network devices.

9. The non-transitory computer-readable storage medium of claim 8, wherein the internal hiatus declaration comprises both the internal hiatus time period and an internal hiatus start time that indicates when the network device is expected to become incommunicable.

10. The non-transitory computer-readable storage medium of claim 8, wherein the non-transitory computer-readable storage medium further comprises instructions which, when executed, cause extending the internal hiatus time period until the particular network device is communicable; resending the internal hiatus declaration to the one or more network devices after the particular network device is communicable.

11. The non-transitory computer-readable storage medium of claim 8, wherein the non-transitory computer-readable storage medium further comprises instructions which, when executed, cause: receiving, at the network device that is in a previously declared communications hiatus, a request to provide secure services to a new member in a group; postponing servicing the request until the particular network device is determined to be communicable; wherein the particular network device provides secure transactions for members of the group.

12. The non-transitory computer-readable storage medium of claim 8, wherein the non-transitory computer-readable storage medium further comprises instructions which, when executed, cause delaying distribution of a new key until the particular network device becomes communicable.

13. The non-transitory computer-readable storage medium of claim 8, wherein the network device hosts a protocol that periodically transmits a keep-alive message or a heartbeat message.

14. The non-transitory computer-readable storage medium of claim 8, wherein the first network device will be incommunicable when the network device is incapable of transmitting the keep-alive message or the heartbeat message.

* * * * *